United States Patent
Arcese et al.

(10) Patent No.: US 10,320,799 B2
(45) Date of Patent: *Jun. 11, 2019

(54) DYNAMIC MULTI-USER COMPUTER CONFIGURATION SETTINGS

(71) Applicant: International Business Machines Corporation, Armonk, NY (US)

(72) Inventors: Mauro Arcese, Rome (IT); Fabio De Angelis, Albano Laziale (IT); Nicola Milanese, Rome (IT); Andrea Napoleoni, Arsoli (IT); Stefano Sidoti, Rome (IT)

(73) Assignee: International Business Machines Corporation, Armonk, NY (US)

(*) Notice: Subject to any disclaimer, the term of this patent is extended or adjusted under 35 U.S.C. 154(b) by 21 days.

This patent is subject to a terminal disclaimer.

(21) Appl. No.: 15/407,065

(22) Filed: Jan. 16, 2017

(65) Prior Publication Data
US 2017/0126691 A1    May 4, 2017

Related U.S. Application Data

(63) Continuation of application No. 14/837,178, filed on Aug. 27, 2015, now Pat. No. 9,588,786, which is a
(Continued)

(51) Int. Cl.
*G06F 7/04* (2006.01)
*G06F 17/30* (2006.01)
(Continued)

(52) U.S. Cl.
CPC .......... *H04L 63/102* (2013.01); *G06F 9/4451* (2013.01); *G06F 21/32* (2013.01); *H04L 63/0861* (2013.01)

(58) Field of Classification Search
CPC ........ G06F 9/4451; G06F 21/32; G06F 3/017; G06K 9/00335; G06K 9/00355;
(Continued)

(56) References Cited

U.S. PATENT DOCUMENTS 7,177,915 B2   2/2007   Kopchik
7,554,522 B2   6/2009   Sinclair, II et al.
(Continued)

FOREIGN PATENT DOCUMENTS

EP      1674975 A2      6/2006
WO   2013133791 A1      9/2013

OTHER PUBLICATIONS

Appendix P, List of IBM Patents or Patent Applications Treated as Related, 2 pages, dated Jan. 17, 2017.
(Continued)

*Primary Examiner* — Trong H Nguyen
(74) *Attorney, Agent, or Firm* — Christopher K. McLane

(57) ABSTRACT

In an approach for managing user profiles, a computer identifies a first user profile and one or more additional user profiles, wherein the first user profile is active on a computing device. The computer receives streaming data. The computer receives a trigger wherein the received trigger includes biometric data. The computer identifies a second user profile from the identified one or more additional user profiles that is associated with the received trigger. The computer compares biometric data from the second user profile with the biometric data in the received trigger. The computer determines whether the biometric data matches, within a defined tolerance level, the biometric data in the second user profile.

20 Claims, 4 Drawing Sheets

Related U.S. Application Data continuation of application No. 14/489,836, filed on Sep. 18, 2014, now Pat. No. 9,582,296.

(51) Int. Cl.
*H04N 7/16* (2011.01)
*H04L 29/06* (2006.01)
*G06F 9/445* (2018.01)
*G06F 21/32* (2013.01)

(58) Field of Classification Search
CPC ..... G06K 9/00221; G06K 2009/00395; G06K 9/00885; G06K 9/00912; G06K 9/00919; H04L 29/08936; H04L 63/102; H04L 63/0861; H04L 29/06809; H04L 29/06823; H04L 29/06755; H04L 29/12518; H04W 12/06; H04W 12/08; H04Q 2213/13515
See application file for complete search history.

(56) References Cited

U.S. PATENT DOCUMENTS

| | | | |
|---|---|---|---|
| 8,027,518 | B2 | 9/2011 | Baker et al. |
| 8,694,694 | B2 | 4/2014 | Fisher et al. |
| 9,374,554 | B1 | 6/2016 | Poulad |
| 2005/0008148 | A1* | 1/2005 | Jacobson ............... G06F 3/038 380/26 |
| 2008/0313315 | A1* | 12/2008 | Karaoguz ............... H04W 8/18 709/222 |
| 2009/0058595 | A1 | 3/2009 | Mainguet et al. |
| 2009/0138805 | A1 | 5/2009 | Hildreth |
| 2011/0300831 | A1 | 12/2011 | Chin |
| 2012/0200391 | A1 | 8/2012 | Sugiyama et al. |
| 2013/0044912 | A1* | 2/2013 | Kulkarni ............ G06K 9/00671 382/103 |
| 2013/0097695 | A1 | 4/2013 | Sipe et al. |
| 2013/0129162 | A1 | 5/2013 | Cheng et al. |
| 2014/0122859 | A1 | 5/2014 | Ruelas |
| 2014/0189850 | A1* | 7/2014 | Marshall ................. G06F 21/30 726/17 |
| 2015/0254057 | A1* | 9/2015 | Klein ...................... G06F 3/167 704/275 |
| 2015/0254058 | A1* | 9/2015 | Klein ...................... G06F 3/167 704/275 |
| 2015/0277573 | A1* | 10/2015 | Kang ...................... G06F 3/017 345/156 |
| 2015/0324564 | A1 | 11/2015 | Sahu et al. |

OTHER PUBLICATIONS

"OS X Mavericks: Set up users on your Mac", Apple, Last Modified: May 8, 2014, <http://support.apple.com/kb/PH14411>.

"Windows NT: Chapter 3—Managing User Work Environments", Copyright 2014 Microsoft Corporation, <http://www.microsoft.com/resources/documentation/windowsnt/4/server/proddocs/en-us/concept/xcp03.mspx>.

"Roaming user profile", From Wikipedia, the free encyclopedia, Last Modified: Jun. 23, 2014, <http://en.wikipedia.org/wiki/Roaming_user_profile>.

Arcese, et al., "Dynamic Multi-User Computer Configuration Settings", U.S. Appl. No. 14/489,836, filed Sep. 18, 2014, 35 pages.

Arcese, et al., "Dynamic Multi-User Computer Configuration Settings", U.S. Appl. No. 14/837,178, filed Aug. 27, 2015, 31 pages.

* cited by examiner

DYNAMIC MULTI-USER COMPUTER CONFIGURATION SETTINGS

BACKGROUND OF THE INVENTION

The present invention relates generally to the field of computer configuration settings, and more particularly to managing computer configuration settings in a multi-user environment.

Computers can be utilized by a single user or shared among multiple users. Operating systems and/or application software can be enabled for multi-users, allowing more than one user to utilize the same computer through unique user accounts. User accounts enable individual utilization of a computer or network service by maintaining separate information in the form of a user profile about each user. The user profile within the user account includes unique settings and preferences (e.g., personal preferences, desktop settings, backgrounds, network connections, etc.) specific to the particular user. The user profiles associated with a user account can be either local (i.e., stored on the local hard disk of a computer) or roaming (i.e., stored on a centralized file server accessible from any network joined desktop computer). Roaming profiles allow users to log on from any computer on the same network and have a consistent desktop experience whereas local profiles are specific to a single computer.

Multi-user systems require users to have authorization to access a computer system and to enable the correct user account and user profile for the user. Authorization is determined when a user provides valid credentials to the computer system to prove identity. Credentials may be a physical/tangible object (e.g., an access badge, near field communication), a piece of knowledge (e.g., a user name and password combination), and/or a facet of a person's physical being (e.g., a biometric feature). Biometric authentication relates to human characteristics and traits such as fingerprints, facial recognition, iris recognition, retinal scans, voice, and hand geometry which are captured by the computer system. The captured data converts the actual image or sound into a digital file which is stored and analyzed by a computer or compared with other files in a database to verify identity and provide authorization to the appropriate user account. Near field communication allows devices to transfer electronically stored information automatically from tags (i.e., small microchips with antennas) by touch or proximity detection (e.g., radio-frequency identification (RFID)). The transferred data automatically identifies and collects data about the object and enters the data directly into the computer system to determine the appropriate user account. Successful authorization of a user through the verification of credentials results in the loading of the user account and user profile providing the appropriate work environment determined by the user.

SUMMARY

Aspects of the present invention disclose a method, computer program product, and system for managing user profiles. The method includes one or more computer processors identifying a first user profile and one or more additional user profiles, wherein the first user profile is active on a computing device. The method further includes one or more computer processors receiving streaming data. The method further includes one or more computer processors receiving a trigger wherein the received trigger includes biometric data. The method further includes one or more computer processors identifying a second user profile from the identified one or more additional user profiles that is associated with the received trigger. The method further includes one or more computer processors comparing biometric data from the second user profile with the biometric data in the received trigger. The method further includes one or more computer processors determining whether the biometric data matches, within a defined tolerance level, the biometric data in the second user profile.

DETAILED DESCRIPTION

Computing resources are configured based on a user profile associated with an active user account (i.e., the user, user account, or user profile responsible for controlling the settings and activity of the computing resource). The configuration of the computing resource is determined by the personal preferences of the associated user to effectively utilize the computing resource (e.g., font size, screen resolution, hardware orientation, etc.). At times, however, computing resources may be utilized by more than one user concurrently. Additional users may utilize similar profile settings as the active user (e.g., both utilize default user profile settings). Users with similar user profile settings may efficiently utilize the same computing resource as the differences between user profiles are deemed to be negligible by the additional user. Other additional users, however, may not utilize similar user profiles (e.g., visually impaired, physically challenged, right handedness, left handedness) and utilize noticeably different user profile settings (e.g., enlarged font, screen resolution, peripheral settings, etc.). Additional users with different user profile settings may need to implement modifications to the active user profile settings or logoff the active user and logon as the new active user to efficiently utilize the same computer resource, which may be inefficient and time consuming, as recognized by embodiments of the present invention.

Embodiments of the present invention manage multiple user profiles on a computing resource concurrently. Multiple user profiles are stored on the computing resource. The user profiles are available to be utilized for the associated user when specified. Embodiments of the present invention utilize triggers to denote when a user profile change is specified. The triggers are stored within the user profile allowing an efficient and targeted switch between user profiles. Additionally, embodiments of the present invention combine biometrics with triggers to recognize the appropriate user profile to dynamically change and synchronize the triggering and switching of profiles between concurrent users of a computing resource.

Figure 1:
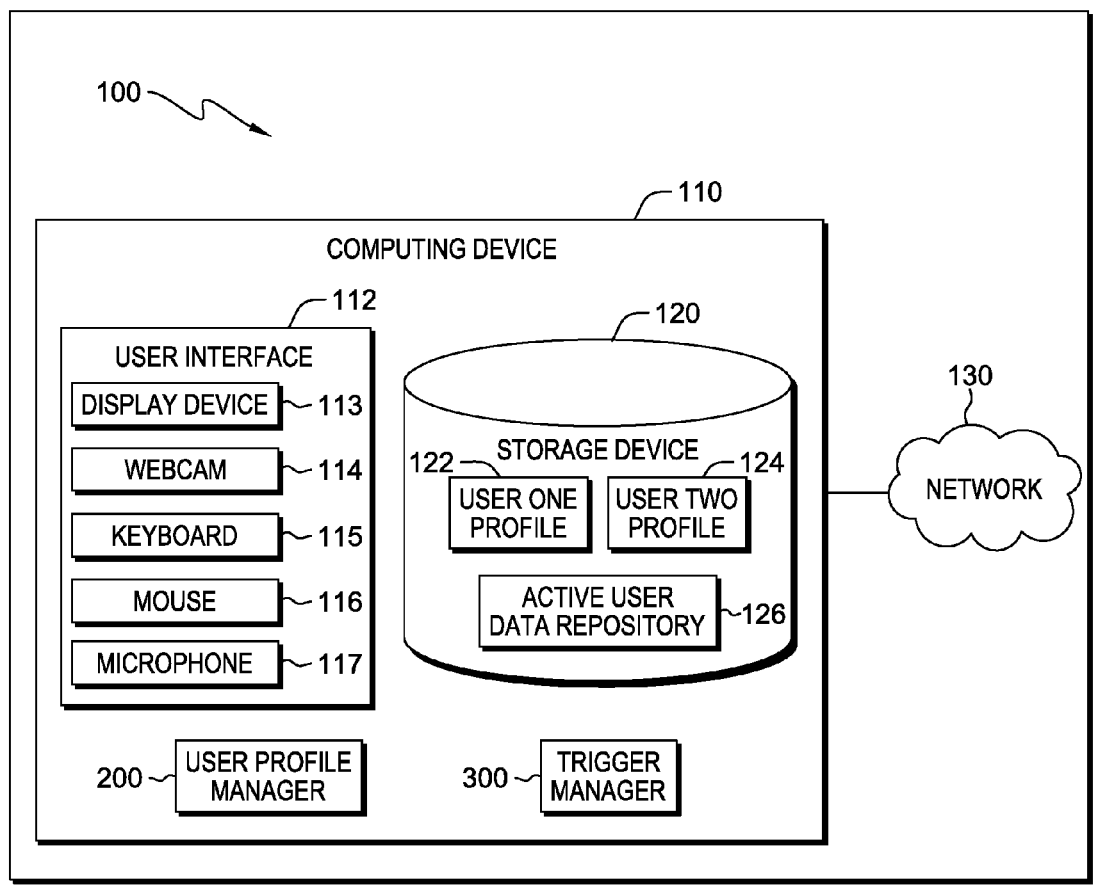
FIG. 1 is a functional block diagram illustrating a multiple user computing environment, in accordance with an embodiment of the present invention.

The present invention will now be described in detail with reference to the Figures. FIG. 1 is a functional block diagram illustrating a multiple user computing environment, generally designated 100, in accordance with one embodiment of the present invention. FIG. 1 provides only an illustration of one embodiment and does not imply any limitations with regard to the environments in which different embodiments may be implemented.

In the depicted embodiment, multiple user computing environment 100 includes computing device 110 and network 130. Multiple user computing environment 100 may include additional computing devices, mobile computing devices, servers, computers, storage devices, or other devices not shown.

Network 130 may be a local area network (LAN), a wide area network (WAN) such as the Internet, a wireless local area network (WLAN), any combination thereof, or any combination of connections and protocols that will support communications between computing device 110, other computing devices, and servers (not shown), in accordance with embodiments of the inventions. Network 130 may include wired, wireless, or fiber optic connections.

Computing device 110 may be a web server, or any other electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 130. In other embodiments, computing device 110 may represent a server computing system utilizing multiple computers as a server system, such as in a cloud computing environment. In general, computing device 110 is representative of any electronic device or combination of electronic devices capable of executing machine-readable program instructions as described in greater detail with regard to FIG. 4, in accordance with embodiments of the present invention. Computing device 110 contains user interface 112, storage device 120, user one profile 122, user two profile 124, active user data repository 126, user profile manager 200, and trigger manager 300.

User interface 112 is a program that provides an interface between a user of computing device 110 and a plurality of applications that reside on computing device 110 and/or may be accessed over network 130. A user interface, such as user interface 112, refers to the information (e.g., graphic, text, sound) that a program presents to a user, and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device such as a keyboard and mouse) through graphical icons and visual indicators as opposed to text-based interfaces, typed command labels, or text navigation. User interface 112 sends and receives information to user profile manager 200 and trigger manager 300. User interface 112 displays information to a user through display device 113. A display device is an output device that visually conveys text, graphics, and video information (i.e., any device capable of displaying a received image, e.g., laptop screen, computer monitor). In one embodiment, user interface 112 receives data through webcam 114 (e.g., built-in computer hardware, universal serial bus (USB) connected video camera). A webcam refers to a video camera that feeds or streams images (i.e., provides frequently updated content) in real time to, or through, a computer as a streaming video. The digitized and encoded streaming video may be saved, viewed, or sent to other network systems for further utilization. In some embodiments, user interface 112 receives data from a user through keyboard 115 (e.g., hardwired, wireless) to input information into computing device 110. In another embodiments, user interface 112 receives data from a user through mouse 116. A mouse is a pointing device that detects two-dimension motion relative to a surface which allows for fine control of a graphical user interface. In some other embodiment, user interface 112 receives audio data (i.e., sounds in the air via streaming audio) through microphone 117 (e.g., built-in or add-on microphone hardware). Computing device 110 may utilize voice recognition software to analyze the received audio data to identify the user speaking utilizing voice biometrics (i.e., speaker recognition) and what is being said (i.e., speech recognition).

Storage device 120 can be implemented with any type of storage device that is capable of storing data that may be accessed and utilized by computing device 110. In one embodiment, storage device 120 resides on computing device 110. In other embodiments, storage device 120 may reside on another server or another computing device connected over network 130, provided that storage device 120 is accessible to computing device 110, user profile manager 200, and trigger manager 300. Storage device 120 includes user one profile 122, user two profile 124, and active user data repository 126.

User one profile 122 comprises a user specific data file. User one profile 122 may include unique settings and preferences (e.g., screen resolution, magnification, mouse orientation, keyboard configuration, etc.), biometric data (e.g., facial characteristics, fingerprints, hand geometry, voice with respect to tones, pitch, and cadence), and triggers (e.g., gestures, voice commands, keystroke combinations, etc.) for a user of computing device 110. Biometric data comprises measureable biological characteristics associated with an individual which can be automatically checked to provide authentication. User one profile 122 supplies the user specific data files for the identified user of computing device 110 to user profile manager 200 and trigger manager 300. In the depicted embodiment, user one profile 122 is stored locally on storage device 120 (e.g., a hard disk) of computing device 110. In another embodiment, user one profile 122 may reside on a server, another computing device, or in a database (e.g., roaming profile) connected over network 130 (not shown), provided user one profile 122 is accessible to computing device 110, user profile manager 200, and trigger manager 300. In some other embodiment, user one profile 122 may not initially exist as the user is new (i.e., user one profile 122 is not found on storage device 120 or over network 130). The operating system on computing device 110 creates user one profile 122 on storage device 120 and assigns a system default profile and default configuration settings. In one embodiment, user one profile 122 is then modified by the new user (i.e., customizes the default profile configuration settings to personal preferences). In another embodiment, the new user does not modify user one profile 122. User two profile 124 is similar to user one profile 122 except user two profile 124 represents a second different user of computing device 110. The number of user profiles are not limited to user one profile 122 and user two profile 124; additional user profiles may exist or be added that are not currently shown in FIG. 1. For the purpose of an example, an initial user of computing device 110 is associated with user one profile 122, and a second user is associated with user two profile 124.

Active user data repository 126 comprises a lookup table of the active user profile names and associated triggers for utilizing computing device 110. A lookup table is an array that replaces runtime computation (i.e., time during which a program executes information processing) with an indexing operation. The array comprises a systematic collection of elements (e.g., values, variables) in a computing resource as organized data for efficient access by other computing devices and applications through an index. In one embodiment, active user data repository 126 is stored within storage device 120 on computing device 110. In another embodiment, active user data repository 126 may reside on another server or another computing device connected over network 130, provided that active user data repository 126 is accessible to computing device 110, user profile manager 200, and trigger manager 300.

User profile manager 200 is a software component which manages multiple user profiles on computing device 110. User profile manager 200 accesses the user profiles and triggers for utilization by trigger manager 300. In some embodiments, user profile manager 200 may assist in the creation of a new trigger for a user profile when a trigger is not defined in the user profile. User profile manager 200 may store multiple active user profile references (e.g., profile name, storage location) and associated triggers in active user data repository 126. In one embodiment, user profile manager 200 resides on computing device 110. In another embodiment, user profile manager 200 may reside on a server or on another computing device connected over network 130, provided user profile manager 200 is accessible to computing device 110, user one profile 122, user two profile 124, active user data repository 126, and trigger manager 300.

Trigger manager 300 is a software component which manages the transition from one user profile to another user profile accessing computing device 110 in response to a trigger. Trigger manager 300 may receive triggers through user interface 112, including but not limited to, webcam 114, keyboard 115, mouse 116, and microphone 117. Trigger manager 300 determines the correct user profile associated with the defined trigger. Trigger manager 300 controls the transition from the existing user profile to the new user profile associated with a unique trigger at the time a trigger is initiated. In one embodiment, trigger manager 300 resides on computing device 110. In another embodiment, trigger manager 300 may reside on a server or on another computing device connected over network 130, provided trigger manager 300 is accessible to computing device 110, user one profile 122, user two profile 124, active user data repository 126, and user profile manager 200.

Figure 2:
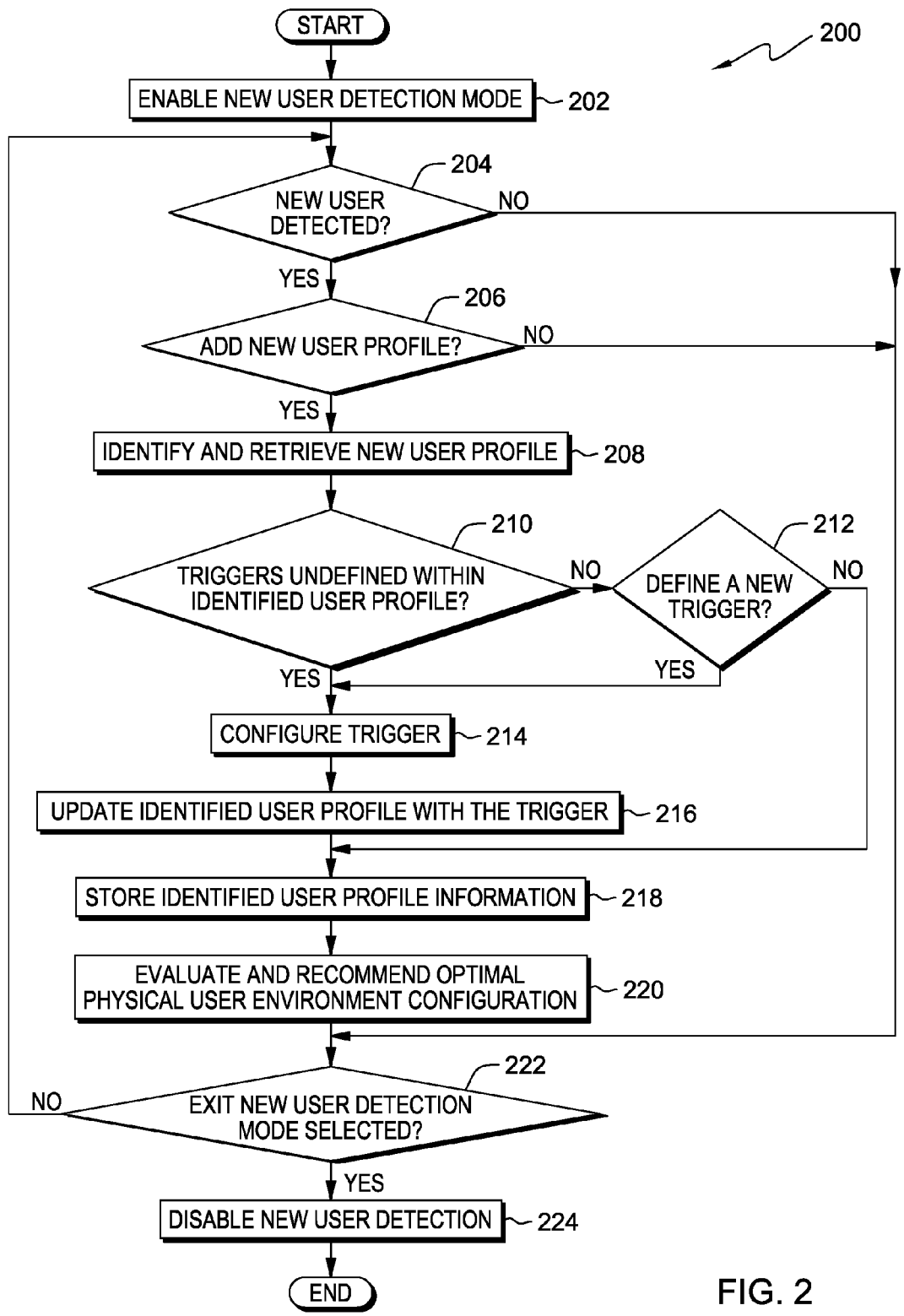
FIG. 2 is a flowchart depicting operational steps of a user profile manager program on a computing device within the multiple user computing environment of FIG. 1 for managing the active profiles accessing a computing resource, in accordance with an embodiment of the present invention.

FIG. 2 is a flowchart depicting operational steps of user profile manager 200 executing within the multiple user computing environment 100 of FIG. 1, in accordance with an embodiment of the present invention. In one embodiment, user profile manager 200 may initiate after an initial user completes login on computing device 110. Login refers to the user account credentials (e.g., combination user id and password) presented by the user, which identify and authenticate the user prior to providing access to a computer system. In another embodiment, user profile manager 200 may initiate at any point upon receipt of a user request through user interface 112 to enable the detection and import of new profiles into user profile manager 200. In an example embodiment, initially, a user is successfully logged into computing device 110 with user one profile 122 at the start of user profile manager 200.

In step 202, user profile manager 200 enables new user detection mode. User profile manager 200 receives a request from a user through user interface 112 to enable new user detection mode. In response to the receipt of the user request, user profile manager 200 initiates. User profile manager 200 receives data inputs (e.g., RFID, streaming video, keystrokes, user selection, streaming audio) through user interface 112 (e.g., webcam 114, keyboard 115, mouse 116, and microphone 117). When enabled, user profile manager 200 may accept new users and profiles for computing device 110. New user profiles may not be added to computing device 110 when user profile manager 200 does not enable new user and profile detection.

In decision 204, user profile manager 200 determines if a new user is detected. User profile manager 200 monitors the received data inputs for indications of a new user (e.g., detection of a new RFID tag, user request to add user). In one embodiment, user profile manager 200 detects a new user through automatic identification and data capture. Automatic identification and data capture refers to methods of automatically identifying objects, collecting data, and entering the data directly into a computer (e.g., bar codes, radio frequency identification, biometrics, magnetic strips, smart cards, and voice recognition). In one embodiment, user profile manager 200 detects a new user through webcam 114. User profile manager 200 identifies a new user within the field of view (i.e., area that is visible through an optical instrument) utilizing facial recognition software. Facial recognition software is a computer application for automatically identifying a person from a video source (e.g., webcam 114). In an example embodiment, a second user enters into the field of view of webcam 114. User profile manager 200 analyzes the video data from webcam 114 with facial recognition software. User profile manager 200 receives two different facial images from the analyzed video source. User profile manager 200 compares the two facial images with the stored facial image within user one profile 122. User profile manager 200 determines one of the facial images matches user one profile 122, and the second facial image is a new user (i.e., does not match user one profile 122). In another embodiment, user profile manager 200 detects a new user through microphone 117. User profile manager 200 identifies a new user within the audio file processed with voice recognition software (i.e., a second voice based on tone, pitch, and cadence is detected within the audio file which does not match the voice recording stored in user one profile 122). In some other embodiment, user profile manager 200 detects a new user through keyboard 115 (e.g., new user enters different logon information in response to a prompt). In yet another embodiment, user profile manager 200 detects a new user through mouse 116 (e.g., a selection is made within a GUI interface through a series of mouse actions to add a user). In yet some other embodiment, user profile manager 200 detects a new user through near filed communication (e.g., RFID, tags) with computing device 110.

If user profile manager 200 determines a new user is detected (decision 204, yes branch), user profile manager 200 continues to decision 206. If user profile manager 200 determines a new user has not been detected (decision 204, no branch), user profile manager 200 continues to decision 222. In decision 222, user profile manager 200 determines whether to exit new user detection mode or resume monitoring for new users.

In decision 206, user profile manager 200 determines whether to add the new user profile. User profile manager 200 determines whether to add the new user profile to computing device 110. User profile manager 200 provides a request to add a new user to the potential active users of computing device 110 through user interface 112. In one embodiment, user profile manager 200 may provide a message through a GUI interface on display device 113 (e.g., message box with selectable "yes" and "no" icons, instructions to press a specific key, etc.). In another embodiment, user profile manager 200 may provide an audio message to add a user. User profile manager 200 awaits a response through user interface 112 to add or refuse the new user prior to continuing. In one embodiment, user profile manager 200 receives an approval indication through user interface 112 to add the new user (e.g., vocal approval, hand gesture, selection of an icon, keyboard entry, etc.). For example, in a multiple user computer laboratory environment, user profile manager 200 detects a new user within the field of view provided by webcam 114. The new user is a visually impaired co-worker, necessitating different profile settings to effectively work on computing device 110 with the existing user. User profile manager 200 receives an approval indication to add the new user profile as an additional potential active user of computing device 110. In another embodiment, user profile manager 200 receives a rejection indication through user interface 112 to not add the new user.

If user profile manager 200 determines to add the new user profile (decision 206, yes branch), then user profile manager 200 continues to step 208. If user profile manager 200 determines not to add a new user profile (decision 206, no branch), then user profile manager 200 continues to decision 222. In decision 222, user profile manager 200 determines whether to exit profile detection mode or resume monitoring for new users.

In step 208, user profile manager 200 identifies and retrieves the new user profile. User profile manager 200 searches for available user profiles. In one embodiment, user profile manager 200 searches for available user profiles within storage device 120. In another embodiment, user profile manager 200 searches for roaming user profiles over network 130. In the depicted embodiment, user profile manager 200 identifies user one profile 122 and user two profile 124 within storage device 120. In one embodiment, user profile manager 200 searches user one profile 122 and user two profile 124 for the credentials associated with the new user account logon process (e.g., combination user name and password). In another embodiment, user profile manager 200 searches user one profile 122 and user two profile 124 for biometric data associated with the new user (e.g., fingerprint, voice recognition, facial recognition). User profile manager 200 evaluates the new user information (e.g., credentials, biometric data) with respect to the stored information in user one profile 122 and user two profile 124. In one embodiment, user profile manager 200 is unable to determine a correct user profile (i.e., user profile does not exist or could not be verified). User profile manager 200 creates a new user profile utilizing the operating system default user profile. In another embodiment, user profile manager 200 determines the correct user profile associated with the provided new user credentials. In an example, user profile manager 200 determines the information stored in user two profile 124 matches the provided new user information requesting access to computing device 110. Therefore, user profile manager 200 identifies user two profile 124 as the new user. In one embodiment, user profile manager 200 retrieves the identified user profile (e.g., user two profile 124) from storage device 120. In another embodiment, user profile manager 200 retrieves the identified user profile from roaming user profiles over network 130. When the user profile is a roaming profile, user profile manager 200 stores a copy of the roaming user profile for the new user within storage device 120.

In decision 210, user profile manager 200 determines if triggers are undefined within the identified user profile. A trigger is a defined action an operating system or application monitors for, which a user can perform to initiate a response. User profile manager 200 searches the identified user profile (e.g., user two profile 124) for defined triggers (e.g., facial recognition, gestures, keystroke combinations, voice commands, etc.). In one embodiment, the identified user profile (e.g., user two profile 124) contains at least one defined trigger. In another embodiment, the identified user profile (e.g., user two profile 124) does not have a defined trigger.

If user profile manager 200 determines the triggers are undefined within the identified user profile (decision 210, yes branch), user profile manager 200 continues to step 214. If user profile manager 200 determines the triggers are defined within the identified user profile (decision 210, no branch), user profile manager 200 continues to decision 212.

In decision 212, user profile manager 200 determines if a new trigger is to be defined. In one embodiment, responsive to determining that the triggers are defined (decision 210, no branch), user profile manager 200 determines if a new trigger is to be defined. If user profile manager 200 determines a new trigger is to be defined (decision 212, yes branch), user profile manager 200 continues to step 214. If user profile manager 200 determines a new trigger is not to be defined (decision 212, no branch), user profile manager 200 continues to decision 218.

In step 214, user profile manager 200 configures a trigger. In an example embodiment, responsive to determining that the triggers are undefined (decision 210, yes branch) or responsive to determining to define a new trigger (decision 212, yes branch), user profile manager 200 configures a trigger (e.g., through interactions with a user via user interface 112). In one embodiment user profile manager 200 configures a trigger through graphical user interface on display device 113. In another embodiment, user profile manager 200 may configure a trigger through a series of vocalized instructions. In some other embodiment, user profile manager 200 may suggest an appropriate trigger definition based on information within the user profiles (e.g., user two profile 124). For example, user two profile 124 may comprise preferences for enlarged graphics and text to voice software indicating a visual impairment. User profile manager 200 may suggest a vocal trigger as the vocal trigger may be easily utilized by the visually impaired user. In yet another embodiment, user profile manager 200 may suggest a trigger based upon an assessment of the physical user environment provided by webcam 114. For example, a user trigger is identified by a right hand movement, but the right hand side of the user is not in the field of view of webcam 114. User profile manager 200 may suggest a new trigger based on a left hand movement which is within the field of view of webcam 114. In one embodiment, user profile manager 200 configures at least one keystroke from keyboard 115 as a trigger. In another embodiment, user profile manager 200 configures a sound input (e.g., vocalization, word, sounds) through microphone 117 as a trigger. In some other embodiment, user profile manager 200 configures a video input (e.g., facial expression, body movement, gesture) through webcam 114 as a trigger. In yet another embodiment, user profile manager 200 configures a mouse action (e.g., motion, pattern) through mouse 116 as a trigger.

In step 216, user profile manager 200 updates the identified user profile with the trigger. User profile manager 200 updates the identified user profile with the defined trigger. In one embodiment, user profile manager 200 replaces the previous defined trigger with the new defined trigger. In another embodiment, user profile manager 200 adds a new trigger to the identified user profile (e.g., user one profile 122, user two profile 124).

In step 218, user profile manager 200 stores the identified user profile information. In one embodiment, user profile manager 200 stores the updated identified user profile (e.g., user one profile 122, user two profile 124, etc.), including the updated trigger information, in storage device 120. In another embodiment, when the updated identified user profile is also a roaming profile, user profile manager 200 may store the updated identified user profile to a server, another computing device, or in a database connected over network 130 (not shown), and in storage device 120. Additionally, user profile manager 200 stores the user profile name (e.g., user one profile 122), location (e.g., storage device 120), and the associated trigger in active user data repository 126.

In step 220, user profile manager 200 evaluates and recommends an optimal physical user environment configuration. The physical user environment configuration refers to the location of users relative to other users and computing device 110. User profile manager 200 evaluates the streaming video provided with respect to the user profiles and triggers. In one embodiment, user profile manager 200 evaluates the physical user environment and determines that the environment is optimized (i.e., physical user positions relative to other users and computing device 110 based on analysis of user profile settings and triggers meet the needs of the users), and user profile manager 200 does not recommend changes to the physical positions of the users. In some other embodiment, user profile manager 200 evaluates the physical user environment and determines that the environment is not optimized, and user profile manager 200 recommends changes to the physical position of users to create an optimal physical user environment. For example, user one profile 122 profile settings are right handed orientation, and user two profile 124 profile settings are left handed orientation, both users utilize triggers via the mouse. User profile manager 200 may suggest the user associated with user two profile 124 move from a current position on the left of the user of user one profile 122 to the right of user one profile 122 to share peripheral devices (i.e., external computer hardware that provides input and output for a computing device) such as mouse 116. User profile manager 200 provides recommendations to the users through user interface 112 (e.g., text message, visual depiction, voice message). While user profile manager 200 may provide recommendation, the implementation of the recommendation is user dependent.

In decision 222, user profile manager 200 determines if exit new user detection mode is selected. User profile manager 200 determines if the existing user requests to no longer accept additional new users on computing device 110. If user profile manager 200 determines the user selects to exit new user detection mode (decision 222, yes branch), user profile manager 200 continues to step 224. If user profile manager 200 determines the user does not request to exit new user detection mode (decision 22, no branch), then user profile manager 200 returns to decision 204 and determines if a new user is detected.

In step 224, user profile manager 200 disables new user detection. In one embodiment, after disabling new user detection mode, user profile manager 200 exits execution and completes and will no longer detect new users. For example, if a new user enters the field of view of webcam 114, the new user will not be included in any further actions. User profile manager 200 can be terminated at any point in the process by the active user. User profile manager 200 can also be initiated at any time by the active user to acquire new users.

Figure 3:
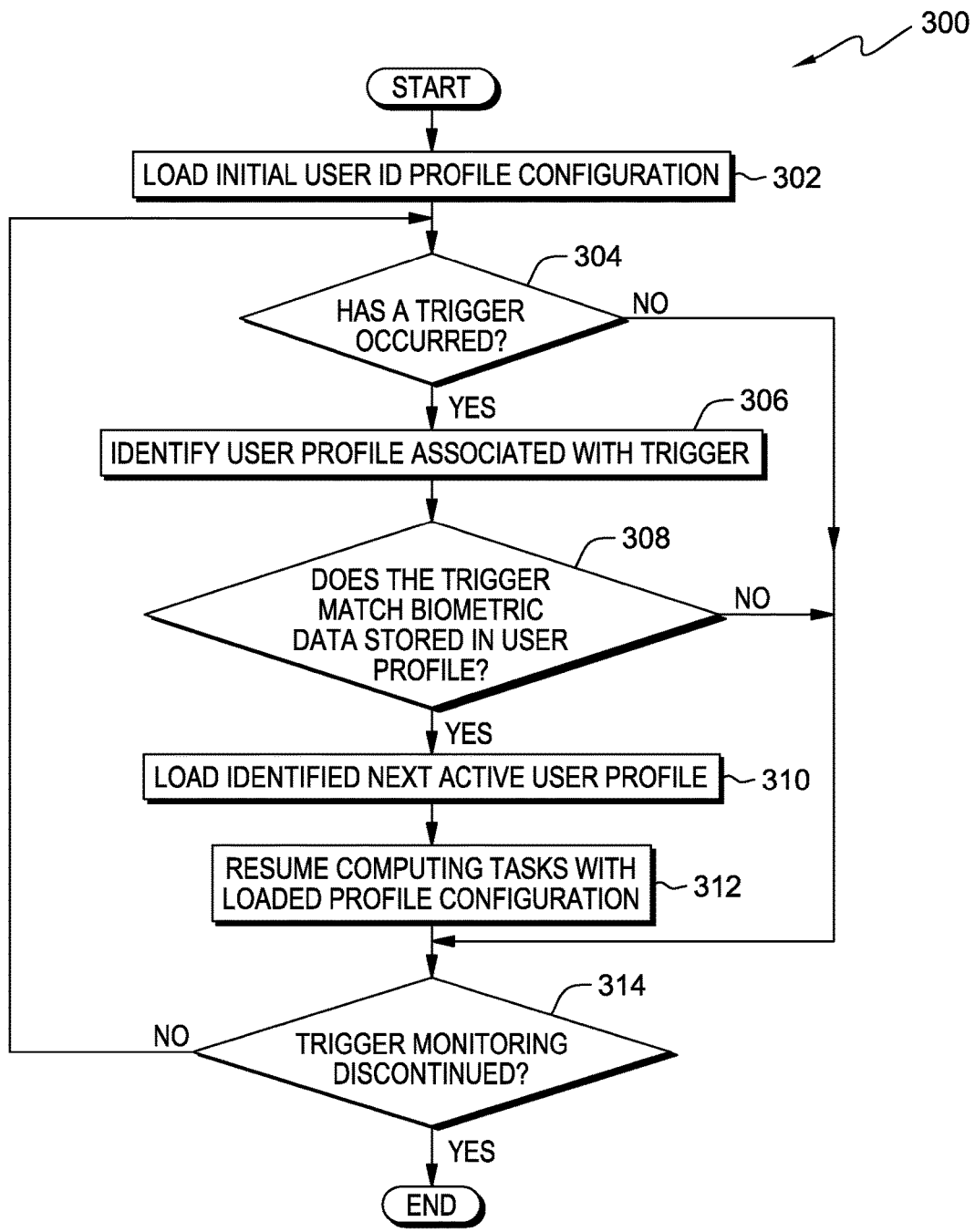
FIG. 3 illustrates operational steps of a trigger manager program on a computing device within the multiple user computing environment of FIG. 1 for switching between active user profiles accessing a computing resource, in accordance with an embodiment of the present invention.

FIG. 3 is a flowchart depicting operational steps of trigger manager 300 executing within the multiple user computing environment 100 of FIG. 1, in accordance with an embodiment of the present invention. Trigger manager 300 initiates in response to identifying more than one user within user profile manager 200 utilizing computing device 110. In one embodiment, trigger manger 300 initiates after completion of user profile manager 200. In another embodiment, trigger manager 300 initiates whenever user profile manager 200 is not enabled to detect new users.

In step 302, trigger manager 300 loads the initial user id profile configuration. Trigger manager 300 utilizes user one profile 122 (i.e., first user logged into computing device 110) for the initial configuration of computing device 110. Trigger manager 300 recognizes the user of the loaded profile (e.g., user one profile 122) to be the active user of computing device 110. Trigger manager 300 loads the stored preferences and settings for the initial user profile (e.g., user one profile 122).

In decision 304, trigger manager 300 determines if a trigger has occurred. Trigger manager 300 receives input activity (e.g., streaming audio files, webcam video feed) through user interface 112. Trigger manager 300 analyzes the received input activity for a defined trigger (i.e., triggers stored in active user data repository 126) to occur. In one embodiment, trigger manager 300 receives a trigger through webcam 114. For example, the second user associated with user two profile 124 makes a hand gesture which is captured by webcam 114. Trigger manager 300 identifies the hand gesture as a defined trigger within active user data repository 126. In another embodiment, trigger manager 300 receives a trigger as a sound or phrase (e.g., phrase of "Switch to Charlie," tapping sequence, whistle, etc.) through microphone 117. In some other embodiment, trigger manager 300 receives a trigger though keyboard 115 (e.g., sequence of keystrokes). In yet some other embodiment, trigger manager 300 receives a trigger through mouse 116 (e.g., pattern movement drawing a large "X" from corner to corner on display device 113).

If user trigger manager 300 determines a trigger has occurred (decision 304, yes branch), then trigger manager 300 continues to step 306. If trigger manager 300 determines a trigger has not occurred (decision 304, no branch), then trigger manager 300 continues to decision 314.

In step 306, trigger manager 300 identifies the user profile associated with the trigger. In one embodiment, in response to determining that a trigger has occurred (decision 304, no branch), trigger manager 300 identifies the user profile that corresponds to the received trigger. Trigger manager 300 searches active user data repository 126 for the received defined trigger. Trigger manager 300 matches the received defined trigger with the stored defined trigger associated with one of the multiple active user profiles stored within active user data repository 126. By matching the received and stored defined trigger, trigger manager 300 identifies the next active user profile (e.g., user two profile 124).

In decision 308, trigger manager 300 determines if the trigger matches the biometric data stored in the user profile. Within the user profile, biometric data (e.g., facial characteristics, fingerprints, voice, retina, etc.) is stored relative to the user. Trigger manager 300 accesses the identified next active user profile (e.g., user two profile 124) on storage device 120. Trigger manager 300 utilizes the stored biometric data in conjunction with the defined trigger to determine if the user initiating the defined trigger and the creator of the defined trigger match. For example, a second user (e.g., user two profile 124) invokes a trigger through a vocalization of a phrase. Trigger manager 300 determines which user profile in active user data repository 126 is associated with utilizing the phrase as a trigger phrase (e.g., user two profile 124). Trigger manager 300 then accesses user two profile 124 for the corresponding biometric data from storage device 120. Within user two profile 124, biometric voice recordings of the utilized trigger phrase are stored. Trigger manager 300 may compare aspects such as tone, pitch, and cadence of the new audio recording of the trigger phrase with the stored recorded trigger phrase in user two profile 124. If the comparison between the comparable aspects of the two recordings match, within a tolerance as set within the parameters of the voice recognition software, then trigger manager 300 determines the user is the same as the creator of the trigger (i.e., is the user corresponding to user two profile 124). If the comparison fails (e.g., one voice phrase is female, the other is male), then trigger manger 300 determines the trigger and the initiator of the trigger are not the same (i.e., is not the user corresponding to user two profile 124).

If user trigger manager 300 determines the trigger matches the biometric data stored in the user profile (decision 308, yes branch), then trigger manager 300 continues to step 310. If trigger manager 300 determines the trigger does not match the biometric data stored in the user profile (decision 308, no branch), then trigger manager 300 continues to decision 314.

In step 310, trigger manager 300 loads the identified next active user profile. Trigger manager 300 instructs computing device 110 to replace the existing active user (e.g., user one profile 122) with the new active user (e.g., user two profile 124). Trigger manager 300 identifies the new active user profile name (e.g., user two profile 124) to computing device 110 as the active user. Computing device 110 updates the existing profile settings to the identified next active user profile settings (e.g., user one profile 122 settings are replaced by the settings for user two profile 124). For example, when initially viewed, display device 113 utilizes the existing profile (e.g., user one profile 122) comprising display settings of small (e.g., no magnification), and basic contrast (e.g., light colored background with grey text). Computing device 110 then loads the active user profile settings (e.g., user two profile 124) comprising display settings as larger (e.g., magnification by fifty percent) and high contrast (e.g., black background with white font). Information now viewed on display device 113 is magnified by fifty percent from the previous view and has a high contrast.

In step 312, trigger manager 300 resumes computing tasks with the loaded profile configuration. In one embodiment, computing device 110 is now configured for a different user (e.g., user profile switched from user one profile 122 to user two profile 124). The user associated with user two profile 124 resumes computing tasks on computing device 110 with the appropriate settings for the specified user.

In decision 314, trigger manager 300 determines if trigger monitoring has been discontinued. In one embodiment, trigger manager 300 determines a system log off has been implemented on computing device 110 (i.e., system is shutdown) and exits trigger monitoring. In another embodiment, trigger manager 300 determines user profile manager 200 has been enabled and exits trigger monitoring (decision 314, yes branch). In some other embodiment, trigger monitoring is not discontinued (decision 314, no branch), and trigger manager 300 resumes at decision 304 to monitor for additional triggers.

Figure 4:
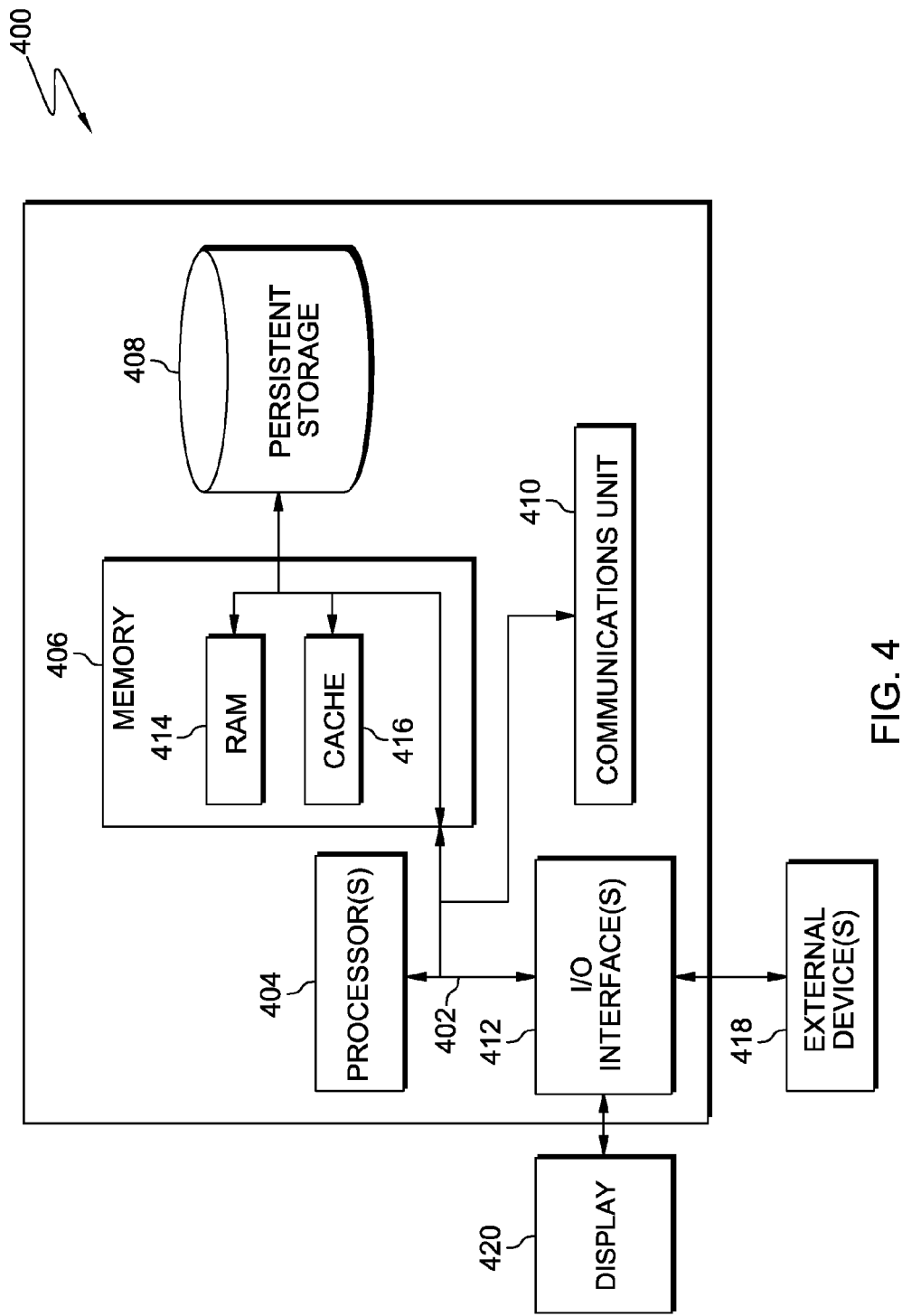
FIG. 4 is a block diagram of components of the computer of FIG. 1 executing the user profile manager and trigger manager programs, in accordance with an embodiment of the present invention.

FIG. 4 depicts a block diagram of components of multiple user computing environment 400 which is representative of multiple user computing environment 100, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Multiple user computing environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User profile manager 200, trigger manager 300, user one profile 122, user two profile 124, and active user data repository 126 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of an enterprise grid and client devices. In these examples, communications unit 410 includes one or more network interface cards. Communications unit 410 may provide communications through the use of either or both physical and wireless communications links. User profile manager 200, trigger manager 300, user one profile 122, user two profile 124, and active user data repository 126 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user profile manager 200, trigger manager 300, user one profile 122, user two profile 124, and active user data repository 126, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing user profiles, the method comprising:
   receiving, by one or more computer processors, streaming data;
   identifying, by one or more computer processors, a first user within the received streaming data;
   responsive to the identifying of the first user, identifying, by one or more computer processors, a first user profile associated with the first user, wherein a second user profile associated with an authenticated second user is active on a first computing device;
   determining, by one or more computer processors, that no defined trigger is stored within the first user profile;
   responsive to the determining that no defined trigger is stored within the first user profile, automatically creating, by one or more computer processors, a trigger for the first user profile, wherein the trigger is a user defined action to automatically switch to the first user profile from the second user profile on the first computing device, wherein the first and second user profiles respectively include computer configuration settings and preferences that are specific to the first and second user profiles;
   updating, by one or more computer processors, the first user profile with the created trigger on the first computing device; and
   automatically switching to the first user profile from the second user profile on the first computing device responsive to receiving the trigger.

2. The method of claim 1, wherein the automatically creating of the trigger for the first user profile further comprises:
   analyzing, by one or more computer processors, the computer configuration settings and preferences stored in the first user profile, wherein the computer configuration settings and preferences stored in the first user profile include unique settings specific to the first user for display settings and peripheral settings; and
   recommending, by one or more computer processors, the trigger based on the analyzed computer configuration settings and preferences stored in the first user profile.

3. The method of claim 2, wherein the recommended trigger is a sound selected from a group of sounds consisting of a tapping sequence received by a sound recording device and a whistle received by the sound recording device.

4. The method of claim 1, wherein the automatically creating of the trigger for the first user profile further comprises:
   identifying, by one or more computer processors, a movement by the identified first user within the received streaming data;
   identifying, by one or more computer processors, a physical environment within a field of view associated with the received streaming data, wherein the field of view is an area that is visible within the received streaming data;
   determining, by one or more computer processors, physical aspects of the first user included within the identified physical environment within the field of view with the identified movement by the first user; and
   recommending, by one or more computer processors, the trigger based on the determined physical aspects of the first user included within the identified physical environment within the field of view with the identified movement by the first user.

5. The method of claim 1, wherein the received streaming data includes one or more of: biometric data from a video recording device and biometric data as streaming audio from a sound recording device, and one or more of: keystrokes from a computer keyboard and mouse actions from a computer mouse that form a pattern of movement.

6. The method of claim 1, further comprising:
   determining, by one or more computer processors whether the first user profile is a roaming user profile; and
   responsive to the determining that the first user profile is the roaming user profile, storing by one or more computer processors, the first user profile and the created trigger on at least one of the following: a server, a second computing device, and a database accessible by a network, in addition to the first computing device.

7. The method of claim 6, wherein the roaming user profile allows the first user to log onto the second computing device and load the first user profile from the network to the second computing device.

8. A computer program product for managing user profiles, the computer program product comprising:
   one or more computer readable storage media and program instructions stored on the one or more computer readable storage media the program instructions comprising:
   program instructions to receive streaming data;
   program instructions to identify a first user within the received streaming data;
   program instructions to, responsive to the identifying of the first user, identify a first user profile associated with the first user, wherein a second user profile associated with an authenticated second user is active on a first computing device;
   program instructions to determine that no defined trigger is stored within the first user profile;

responsive to the determining that no defined trigger is stored within the first user profile, program instructions to automatically create a trigger for the first user profile, wherein the trigger is a user defined action to automatically switch to the first user profile from the second user profile on the first computing device, wherein the first and second user profiles respectively include computer configuration settings and preferences that are specific to the first and second user profiles;

program instructions to update the first user profile with the created trigger on the first computing device; and program instructions to automatically switch to the first user profile from the second user profile on the first computing device responsive to receiving the trigger.

9. The computer program product of claim 8, wherein the automatically creating of the trigger for the first user profile further comprises program instructions, stored on the one or more computer readable storage media, to:

analyze the computer configuration settings and preferences stored in the first user profile, wherein the computer configuration settings and preferences stored in the first user profile include unique settings specific to the first user for display settings and peripheral settings; and recommend the trigger based on the analyzed computer configuration settings and preferences stored in the first user profile.

10. The computer program product of claim 9, wherein the recommended trigger is a sound selected from a group of sounds consisting of a tapping sequence received by a sound recording device and a whistle received by the sound recording device.

11. The computer program product of claim 8, wherein the automatically creating of the trigger for the first user profile further comprises program instructions, stored on the one or more computer readable storage media, to:

identify a movement by the identified first user within the received streaming data;

identify a physical environment within a field of view associated with the received streaming data, wherein the field of view is an area that is visible within the received streaming data;

determine physical aspects of the first user included within the identified physical environment within the field of view with the identified movement by the first user; and recommend the trigger based on the determined physical aspects of the first user included within the identified physical environment within the field of view with the identified movement by the first user.

12. The computer program product of claim 8, wherein the received streaming data includes one or more of: biometric data from a video recording device and biometric data as streaming audio from a sound recording device, and one or more of: keystrokes from a computer keyboard and mouse actions from a computer mouse that form a pattern of movement.

13. The computer program product of claim 8, further comprising program instructions, stored on the one or more computer readable storage media, to:

determine whether the first user profile is a roaming user profile; and responsive to the determining that the first user profile is the roaming user profile, store the first user profile and the created trigger on at least one of the following: a server, a second computing device, and a database accessible by a network, in addition to the first computing device.

14. The computer program product of claim 13, wherein the roaming user profile allows the first user to log onto the second computing device and load the first user profile from the network to the second computing device.

15. A computer system for managing user profiles, the computer system comprising:

one or more computer processors, one or more computer readable storage media, and program instructions stored on the one or more computer readable storage media for execution by at least one of the one or more computer processors, the program instructions comprising:

program instructions to receive streaming data;

program instructions to identify a first user within the received streaming data;

program instructions to, responsive to the identifying of the first user, identify a first user profile associated with the first user, wherein a second user profile associated with an authenticated second user is active on a first computing device;

program instructions to determine that no defined trigger is stored within the first user profile;

responsive to the determining that no defined trigger is stored within the first user profile, program instructions to automatically create a trigger for the first user profile, wherein the trigger is a user defined action to automatically switch to the first user profile from the second user profile on the first computing device, wherein the first and second user profiles respectively include computer configuration settings and preferences that are specific to the first and second user profiles;

program instructions to update the first user profile with the created trigger on the first computing device; and program instructions to automatically switch to the first user profile from the second user profile on the first computing device responsive to receiving the trigger.

16. The computer system of claim 15, wherein the automatically creating of the trigger for the first user profile further comprises program instructions, stored on the one or more computer readable storage media, to:

analyze the computer configuration settings and preferences stored in the first user profile, wherein the computer configuration settings and preferences stored in the first user profile include unique settings specific to the first user for display settings and peripheral settings; and recommend the trigger based on the analyzed computer configuration settings and preferences stored in the first user profile.

17. The computer system of claim 16, wherein the recommended trigger is a sound selected from a group of sounds consisting of a tapping sequence received by a sound recording device and a whistle received by the sound recording device.

18. The computer system of claim 15, wherein the automatically creating of the trigger for the first user profile further comprises program instructions, stored on the one or more computer readable storage media, to:

identify a movement by the identified first user within the received streaming data;

identify a physical environment within a field of view associated with the received streaming data, wherein the field of view is an area that is visible within the received streaming data;

determine physical aspects of the first user included within the identified physical environment within the field of view with the identified movement by the first user; and recommend the trigger based on the determined physical aspects of the first user included within the identified physical environment within the field of view with the identified movement by the first user.

19. The computer system of claim 15, further comprising program instructions, stored on the one or more computer readable storage media, to:

determine whether the first user profile is a roaming user profile; and responsive to the determining that the first user profile is the roaming user profile, store the first user profile and the created trigger on at least one of the following: a server, a second computing device, and a database accessible by a network, in addition to the first computing device.

20. The computer system of claim 19, wherein the roaming user profile allows the first user to log onto the second computing device and load the first user profile from the network to the second computing device.

* * * * *